(12) United States Patent
Iwase (10) Patent No.: US 6,461,054 B1
(45) Date of Patent: Oct. 8, 2002

(54) ADAPTER HAVING A LIGHT-SHIELDING SHUTTER AND OPTICAL MODULE RECEPTACLE HAVING A LIGHT-SHIELDING SHUTTER

(75) Inventor: Masayuki Iwase, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/695,696

(22) Filed: Oct. 24, 2000

(30) Foreign Application Priority Data

Oct. 25, 1999 (JP) ............................................ 11-302181
Aug. 21, 2000 (JP) ........................................ 2000-250026

(51) Int. Cl.⁷ ................................................ G02B 6/38
(52) U.S. Cl. .............................. 385/73; 385/70; 385/75
(58) Field of Search .............................. 385/73, 58, 53, 385/70, 75; 439/136, 137, 142, 145

(56) References Cited

U.S. PATENT DOCUMENTS

| 4,217,019 A | * | 8/1980 | Cameron ..................... 439/137 |
| 4,277,135 A | * | 7/1981 | Schrott et al. ................. 385/59 |
| 5,104,242 A | | 4/1992 | Ishikawa |
| 5,944,542 A | * | 8/1999 | Lee ............................. 439/140 |
| 6,071,015 A | * | 6/2000 | Erbse et al. .................... 385/53 |

FOREIGN PATENT DOCUMENTS

| EP | 0788002 A1 | 1/1997 |
| EP | 0788002 A1 | 8/1997 |
| JP | 57-9918 | 1/1982 |
| JP | 57-43412 | 3/1982 |
| JP | 63-6408 | 1/1988 |
| JP | 2-148109 | 12/1990 |
| JP | 3-3132708 | 6/1991 |
| JP | 08-043681 | 2/1996 |
| JP | 08-046381 | 2/1996 |

* cited by examiner

Primary Examiner—Khiem Nguyen
Assistant Examiner—Chandrika Prasad
(74) Attorney, Agent, or Firm—Knobbe, Martens, Olson, & Bear LLP (57) ABSTRACT

The present invention provides an inexpensive and easily manufactured adapter and optical module receptacle which can prevent light from leaking where an optical connector is disconnected, wherein a roughly L-shaped shutter plate (3) is attached in the housing (1) for fitting and insertion of an optical connector by utilizing a supporting plate. In the state where the shutter plate is attached, the roughly L-shaped erectable portion (7) of the shutter plate (3) is erected so as to shield light that is transmitted to the optical connector insertion port (2) of the housing (1). In the state where an optical connector is fitted in the housing (1), the corresponding erectable portion (7) is folded by the optical connector to ensure that the corresponding optical connector receives light. Where the optical connector is disconnected from the housing (1), the abovementioned erectable portion (7) is erected by its resilient restorative force, wherein the light is shielded and is prevented from leaking to the outside of the housing (1) through the optical connector portion (2).

20 Claims, 11 Drawing Sheets

ADAPTER HAVING A LIGHT-SHIELDING SHUTTER AND OPTICAL MODULE RECEPTACLE HAVING A LIGHT-SHIELDING SHUTTER

FIELD OF THE INVENTION

The present invention relates to an adapter having a light-shielding shutter and an optical module receptacle having a light-shielding shutter, which are used for optical transmissions executed with optical fibers connected to an optical oscillating device such as a semiconductor laser, etc.

BACKGROUND OF THE INVENTION

Figure 11A:
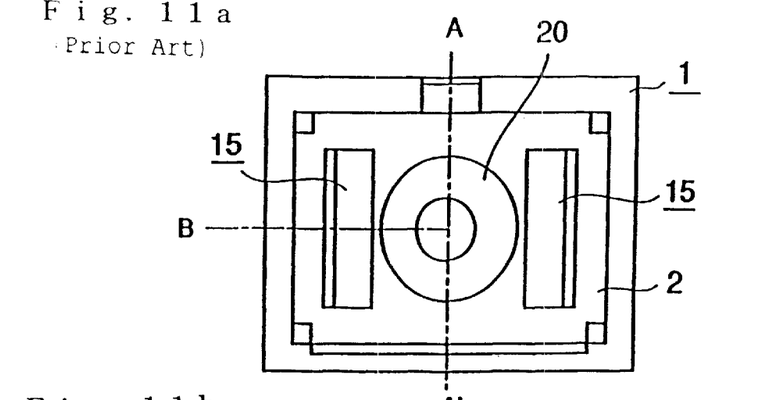
FIG. 11a is a front elevational view showing one example of the prior art adapter.
Figure 11B:
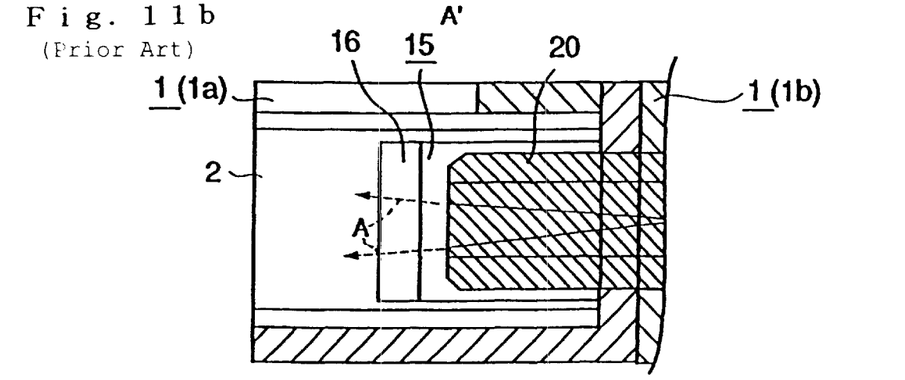
FIG. 11b is a cross-sectional view of the portion A–A' of the adapter illustrated in FIG. 11a, and FIG. 11c is a view showing the adapter illustrated in FIG. 11a, which is observed from the bottom side of the adapter, with the adapter cut off by the line A'–B.
Figure 11C:
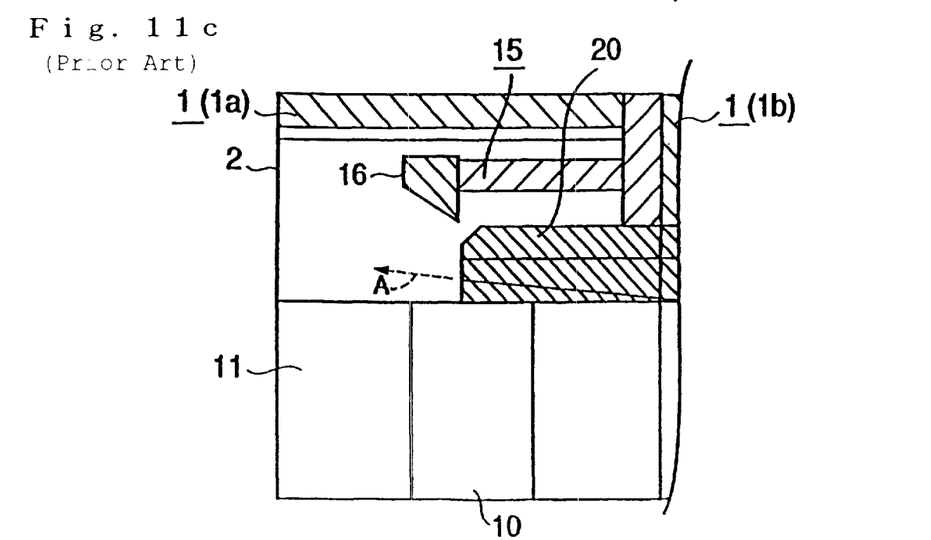

Oscillating light transmitted from an optical oscillating device such as a semiconductor laser, etc., is optically coupled to optical fibers, whereby optical transmissions have been carried out by transmitting the abovementioned oscillating light by the corresponding optical fibers. FIG. 11a is a front elevational view showing one example of an adapter for fitting an optical connector used for optical transmissions. FIG. 11b is a cross-sectional view of an adapter illustrated in FIG. 11a, which is taken along the line A–A' therein. FIG. 11c is a view showing the bottom view of the adapter shown in FIG. 11a, which is partially cut off along the line A'–B therein. The adapter illustrated in FIG. 11a, 11b and 11c is an adapter that fits a SC connector used as an optical connector.

The adapter shown in these drawings FIG. 11a, FIG. 11b and FIG. 11c has two square-tubular housings 1 (1a and b). One end side of the respective housings 1a and b is constructed as an insertion port (optical fiber insertion port) of an optical connector, and the housing 1a and housing b are fixed so that the optical insertion port 2 and the opposite end side are caused to face each other. By inserting optical connectors from the optical insertion ports 2 of the respective housings 1a and 1b of the adapter along the tubular direction of the respective housings 1, the optical connectors are fitted to both end sides of the adapter. Thus, by the fitting of the optical connectors, it becomes possible to connect optical fibers secured in the respective optical connectors to each other.

Further, the respective housings 1a and 1b are provided with a cylindrical ferrule insertion tube 20 and connector engagement portions 15 equipped with an engagement claw 16 at the tip end side thereof. Where optical connectors are inserted into the abovementioned respective housings 1a and 1b, the tip end sides (connection end face sides) of the optical connectors are engaged by the connector engagement portions 15, and the end side of a ferrule secured at the optical connector is inserted into the ferrule insertion tube 20.

The optical fibers provided in one optical connector (for example, the optical connector inserted into and fitted to the housing 1b) of optical connectors inserted into and fitted to the abovementioned adapter are connected to the transmission portion side of an optical oscillating device and to the output side of an optical amplifier. The optical fibers transmits light transmitted from the optical oscillating device and light amplified by the optical amplifier, and outputs the light through the connection end face side of the optical connector.

The outputted light is transmitted through the ferrule insertion tube 20 as shown by the arrow line A shown in FIG. 11b and FIG. 11c, and enters an optical connector on the other side (in this case, the optical connector inserted into and fitted to the housing 1a).

Also, as shown in FIG. 11c, a bottom groove 10 is formed to fit a fixing metal fitting at the bottom outer wall 11 of the housing 11. Also, a side groove (not illustrated) is formed to fit a fixing metal fitting, which communicates with the abovementioned bottom groove 10, on the outer wall of both side portions of the housing 1. The fixing metal fitting to fix the abovementioned adapter at the fixing portion is provided with a plate provided along the bottom groove 10 of the housing 1 and a plate erect from the corresponding plate along both side walls of the housing 1, and the shape thereof is channel-shaped, wherein the abovementioned adapter can be fixed at the fixing portion by fitting the bottom groove 10 and side groove of the adapter to the fixing metal fitting.

Further, an optical receptacle used for optical transmissions has a housing whose structure is similar to that of the abovementioned housing 1, and is constructed so that a package in which an LD (laser diode) module is incorporated at the side opposed to the optical connector insertion port 2 of the housing. This type of an optical module receptacle is constructed so that an LD (laser diode) is incorporated in the abovementioned LD module package, and light transmitted from the LD is caused to enter the optical fibers of an optical connector fitted to the housing.

OBJECTS AND SUMMARY OF THE INVENTION

However, optical output of a semiconductor laser and an optical amplifier, which are used for optical transmissions, has been intensified in line with high bit rate transmissions in recent optical transmissions. For example, there are cases where the abovementioned optical output exceeds 100 mW through 1W.

There was a problem in that, in a case where an optical connector located at the side which receives light is disconnected by mistake during optical transmissions in which light of such high output is transmitted from the connection end face side of an optical connector fitted to one side of the adapter toward another optical connector fitted to the other side of the adapter, the light which is about to enter the optical connector side at the receiving side leaks from the optical connector insertion port 2 to the outside of the adapter.

Also, there was a problem similar to the above in the case where an optical connector fitted to the housing of the optical module receptacle is disconnected by mistake.

Figure 12:
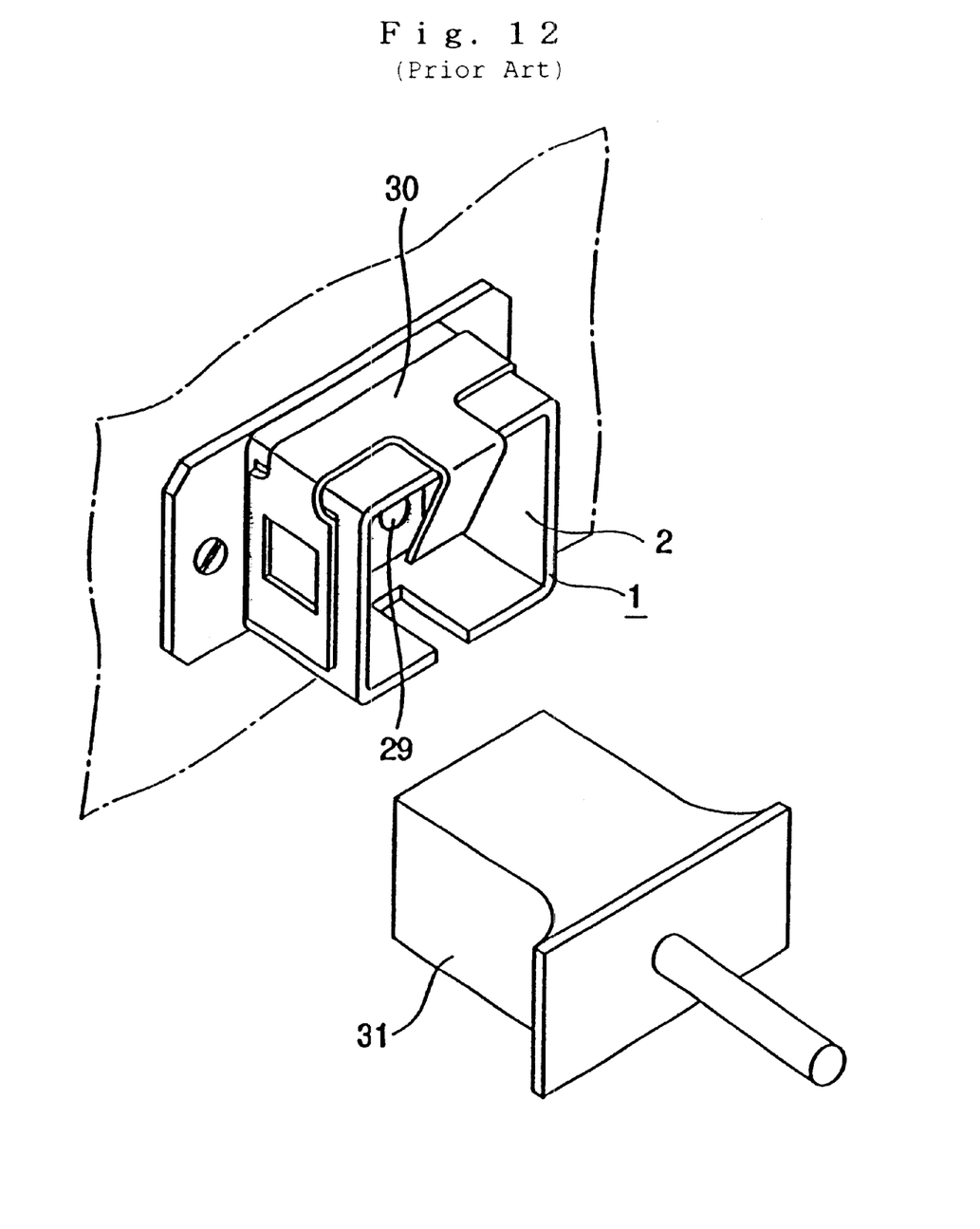
FIG. 12 is a perspective view showing an adapter having a light shielding shutter proposed previously together with an optical connector.

Therefore, in order to solve the abovementioned problems, for example, an adapter that is provided with a cover component 30 as shown in FIG. 12, has been proposed. The cover component 30 is to shield light that leaks through the optical connector insertion port 2 when the receiving side optical connector is disconnected. Also, reference number 29 in the drawing indicates an optical transmission portion, and reference number 31 indicates an optical connector fitted to the adapter.

However, in the proposal, since the cover component 30 has a complicated shape, it is difficult to produce an adapter having such a cover component, and production yield was not good. Further, the cover component 30 must be made of a special material to shield the light. Therefore, since a cover component 30 having a complicated shape must be made of a special material, there was another problem in that the cost of the adapter was increased.

Accordingly, the invention was developed to provide an adapter having an inexpensive light shielding shutter and an inexpensive and easily manufactured optical module receptacle having the same shutter, which is able to prevent light from leaking in cases where the light receiving side optical connector is disconnected.

That is, a first aspect of an adapter having a light shielding shutter according to the invention is an adapter having a tubular housing, in which one end portion of the corresponding housing is constructed as an insertion port of an optical connector, through which an optical connector is inserted along the tubular direction of the housing, wherein the adapter is provided with a roughly L-shaped shutter made of a resilient material and having a bottom plate secured along the bottom outer wall of the housing and an erectable portion which is erect from the corresponding bottom plate toward the corresponding optical connector insertion port side and interrupts light transmitted from the other end portion of the corresponding housing side toward the optical connector insertion port side, and a supporting plate having a bottom plate secured along the bottom outer wall of the housing and a side plate erect from the bottom plate along both side walls of the housing, the bottom plate of the shutter plate is placed between the bottom outer wall of the housing and the bottom plate of the supporting plate, the shutter is fixed in the housing by fixing the side plate of the supporting plate, the erectable portion of the shutter is folded in the bottom inner wall of the housing by the erectable portion of the shutter being inserted into an optical connector when the optical connector is inserted into the adapter to enable the light to enter the optical connector, and when the optical connector is not fitted in the adapter, the light is interrupted by the erectable portion of the shutter being made erect toward the optical connector insertion port side.

Also, a second aspect of an adapter having a light shielding shutter according to the invention is featured in that, in addition to the first aspect of an adapter having the light shielding shutter, a supporting plate fitting groove to which a side plate of the supporting plate is fitted is formed at the outer wall at both sides of the housing, and the side plates of the supporting plate are fitted to and fixed at the supporting plate fitting groove so that the outer plates at both side of the housing are placed between the side plates of the supporting plate.

Further, a third aspect of an adapter having a light shielding shutter according to the invention is featured in that, in addition to the first or second aspect of the adapter having the light shielding shutter, a guiding member provided with an insertion guiding portion which guides the insertion direction of optical connectors is mounted on the housing so as to cause the tip end side thereof to protrude forward from the optical connector insertion port of the housing.

In addition, a fourth aspect of an adapter having a light shielding shutter according to the invention is featured in that, in addition to the first or second aspect of the adapter having a light shielding shutter, a shutter plate insertion hole is formed halfway in the tubular direction of the housing on the bottom of the housing, and the erectable portion of the shutter plate is constructed so as to be erect from the shutter plate insertion hole into the tube of the housing, wherein the tubular hole of the housing from the optical connector insertion portion to the portion where the shutter plate insertion hole is formed is constructed as an insertion guiding portion which guides the insertion direction of optical connectors.

Further, a fifth aspect of an adapter having a light shielding shutter according to of the invention is featured in that, in addition to any one of the first through the fourth aspects of the adapter having a light shielding shutter, a cross-shaped portion is formed on the bottom portion plate of a supporting plate.

In the first through fifth aspects of an adapter having a light shielding shutter according to the invention, the adapter is provided with a tubular-shaped housing and a shutter plate equipped with an erectable portion which interrupts light transmitted toward the optical connector insertion port side of the corresponding housing. Therefore, when an optical connector is inserted into and fitted to an adapter, the erectable portion of the abovementioned shutter plate is folded toward the inner wall of the bottom portion of the housing by insertion of the optical connector, and light is allowed to enter the optical connector. Also, when the optical connector is not fitted to the adapter, the erectable portion of the shutter plate is erected toward the optical connector insertion port side by its resilient restorative force, thereby interrupting or shielding the light. Accordingly, even though the receiving side optical connector is disconnected by mistake during optical transmissions, light is shielded by the shutter plate, and it becomes possible to prevent the light from leaking from the optical connector insertion port to the outside.

A first aspect of an optical module receptacle having a light shielding shutter according to the invention is an optical module receptacle provided with a tubular housing, one end portion of which is constructed as an optical connector insertion portion through which an optical connector is inserted along the tubular direction of the housing, wherein the optical module receptacle is provided with a roughly L-shaped shutter plate made of a resilient material and having a bottom plate which is secured along the bottom outer wall of the housing and an erectable portion which is erect from the bottom plate toward the optical connector insertion port side and shields light transmitted from the other end side of the housing toward the optical connector insertion port side, and a supporting plate having a bottom plate secured along the bottom outer wall of the housing and a side plate erect along both side walls of the housing from the bottom plate, the bottom plate of the shutter plate is placed between the bottom outer wall of the housing and the bottom plate of the supporting plate, the shutter plate is fixed in the housing by fixing the side plate of the supporting plate, the erectable portion of the shutter plate is folded toward the bottom inner wall side of the housing by insertion of an optical connector when the optical connector is inserted into and fitted to the optical module receptacle to allow the light to enter the optical connector, and the erectable portion of the shutter plate is erected toward the optical connector insertion port side by its resilient restorative force to interrupt or shield the light.

Further, a second aspect of an optical module receptacle according to the invention is featured in that, in addition to the first aspect of an optical module receptacle according to the invention, a supporting plate fitting groove in which side plates of the supporting plate are provided at both side outer walls of the housing, and the side plates of the supporting plate are inserted into and fitted to the supporting plate fitting groove so that both side outer wall of the housing are placed therebetween.

Also, a third aspect of an optical module receptacle is featured in that, in addition to the first or second aspect of the optical module receptacle having a light shielding shutter, a guiding member equipped with an insertion guiding portion which guides the insertion direction of an optical connector is mounted on the housing so as to cause the tip end side thereof to protrude forward from the optical connector insertion port of the housing.

A fourth aspect of an optical module receptacle having a light shielding shutter according to the invention is featured in that, in addition to the first or second aspect of the optical module receptacle having a light shielding shutter, a shutter plate insertion hole is formed halfway in the tubular direction of the housing on the bottom of the housing, and the erectable portion of the shutter plate is constructed so as to be erect from the shutter plate insertion hole into the tube of the housing, wherein the tubular hole of the housing from the optical connector insertion portion to the portion where the shutter plate insertion hole is formed is constructed as an insertion guiding portion which guides the insertion direction of optical connectors.

Further, a fifth aspect of an optical module receptacle having a light shielding shutter according to the invention is featured in that, in addition to anyone of the first through the fourth aspects of the optical module receptacle having a light shielding shutter, a cross-shaped portion is formed on the bottom portion plate of a supporting plate.

In the first through fifth aspects of an optical module receptacle having a light shielding shutter according to the invention, as in the adapter having a light shielding shutter, the optical module receptacle is provided with a tubular-shaped housing and a shutter plate equipped with an erectable portion which interrupts light transmitted toward the optical connector insertion port side of the corresponding housing. Therefore, when an optical connector is inserted into and fitted to an optical module receptacle, the erectable portion of the abovementioned shutter plate is folded toward the inner wall of the bottom portion of the housing by insertion of the optical connector, and light is allowed to enter the optical connector. Also, when the optical connector is not fitted to the optical module receptacle, the erectable portion of the shutter plate is erected toward the optical connector insertion port side by its resilient restorative force, thereby interrupting or shielding the light. Accordingly, even though the receiving side optical connector is disconnected by mistake during optical transmissions, light can be shielded by the shutter plate.

Since a shutter plate, which constitutes the first through fifth aspects of an adapter having a light shielding shutter according to the invention and the first through fifth aspects of an optical module receptacle having a light shielding shutter according to the invention, is a roughly L-shaped shutter having a very simple shape or profile having the abovementioned erectable portion and bottom plate secured along the bottom outer wall of the housing, the production thereof is very easy.

Also, only by placing the shutter plate between the supporting plate provided with the bottom plate secured along the bottom outer wall of the housing and with the side plate erect from the corresponding bottom plate along both side walls of the housing and the bottom outer wall of the housing, and fixing the same shutter plate therebetween, the abovementioned shutter plate can be fixed in the housing. Thus, it is very easy to mount the shutter plate and supporting plate, wherein it is possible to easily produce the adapter having a light shielding shutter and optical module receptacle having the same at a high yield ratio.

Further, as described above, such a construction is employed, in which the shutter plate is made roughly L-shaped and it is supported and fixed in the housing by utilizing the supporting plate, whereby since the portion which must be made of a special material having an excellent light shielding property can be minimized, the production cost thereof can be accordingly reduced. Therefore, it is possible to provide an inexpensive adapter and an inexpensive optical module receptacle.

For example, conventionally, in order to prevent light from leaking where an optical connector is disconnected, a member which has both functions of the shutter plate and pressing plate was attached to the housing. The member was expensive and was formed of an ultra-resilient material such as, for example, NiTi, which is hard to be machined. On the contrary, in the invention, the shutter is made of an expensive ultra-resilient material NiTi, and the supporting plate is constructed of inexpensive stainless steel, etc., whereby the production can be further facilitated and the cost thereof can be decreased in comparison with the prior arts.

Also, in an adapter having a light shielding shutter and an optical module receptacle having the light shielding shutter according to the invention, by such a construction in which the side plates of the supporting plate are inserted into and fitted to the supporting plate fitting groove secured at the side outer wall of the housing, it is possible to further reliably attach the shutter plate in position.

Still further, an adapter having a light shielding shutter and an optical module receptacle having the light shielding shutter according to the invention employ such constructions in which a guiding member provided with an insertion guiding portion which guides the insertion direction of optical connectors is mounted in the housing, and in which a shutter plate insertion hole is formed on the bottom portion of the housing, the erectable portion of the shutter plate is made erect from the abovementioned shutter plate insertion hole toward the tubular hole side of the housing, and a tubular hole of the housing from the optical connector insertion port to the portion where the shutter plate insertion hole is formed is constructed as the abovementioned insertion guide member. Therefore, the insertion of optical connectors into the housing can be accurately guided by the insertion guiding portion, whereby the optical connectors can be accurately inserted, and the shutter plate can be accurately folded by optical connectors.

In addition, in an adapter having a light shielding shutter and an optical module receptacle having the light shielding shutter according to the invention, since a cross-shaped portion is formed on the bottom plate of the supporting plate, the supporting plate can be securely prevented from coming off with respect to the housing.

BRIEF DESCRIPTION OF THE DRAWINGS

These and other objects and advantages of the present invention will become more apparent and more readily appreciated from the following detailed description of the exemplary embodiments of the invention taken in conjunction with the accompanying drawings, in which:

FIG. 2c is a view showing the housing, illustrated in FIG. 2a, from its bottom side with the housing cut off along the line A'–B;

FIG. 3b is a plan view of the shutter plate shown in FIG. 3a;

FIG. 4b is a front elevational view of a supporting plate illustrated in FIG. 4a;

FIG. 5b is a perspective view of a guiding member attached to the housing illustrated in FIG. 5a;

DETAILED DESCRIPTION OF THE PREFERRED EMBODIMENTS

A detailed description is given of embodiments of the invention with reference to the accompanying drawings.

Figure 1A:
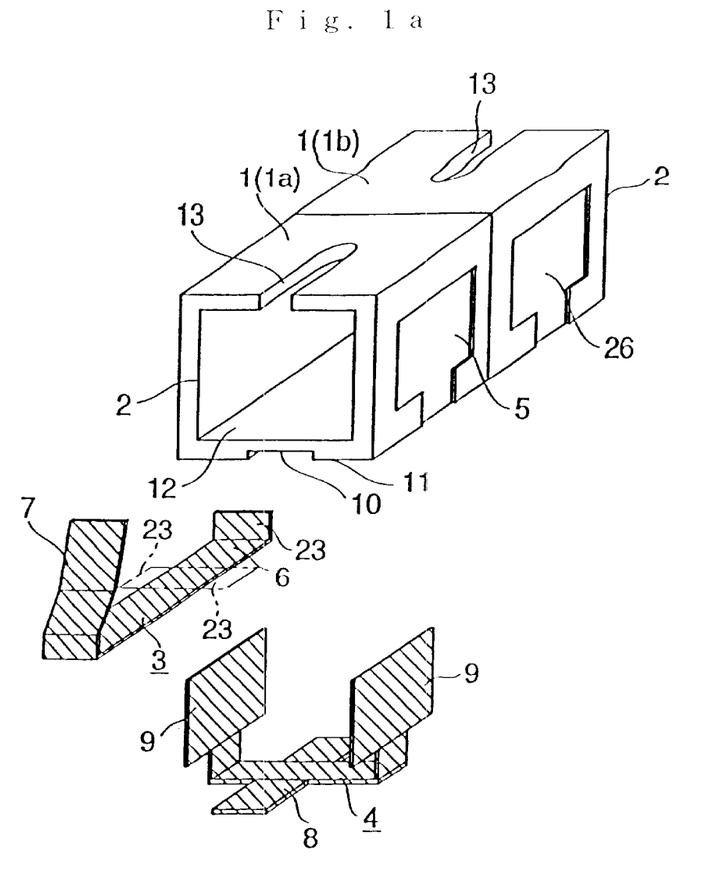
FIG. 1a is a disassembled view of a first embodiment of an adapter having a light shielding shutter according to the invention.
Figure 1B:
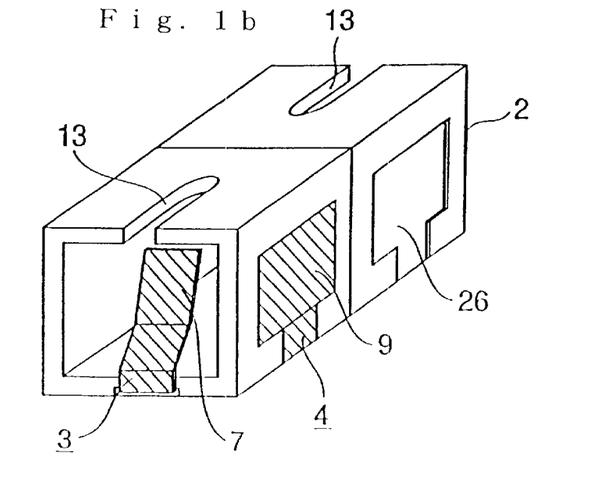
FIG. 1b is a perspective view of the adapter having the same light shielding shutter.

In FIG. 1a, the first embodiment of an adapter having a light shielding shutter according to the invention is illustrated in a disassembled state. In FIG. 1b, a perspective view is illustrated, which shows the first embodiment of an adapter having a light shielding shutter according to the invention. Also, in the description of the first preferred embodiment, parts which are identical to those of the prior art example described above are given the same reference numbers, and overlapping description thereof is omitted.

As shown in FIG. 1a and FIG. 1b, an adapter having a light shielding shutter according to the first preferred embodiment has two housings 1 (1a and 1b) which is almost similar to that of the prior art example. These two housings 1 (1a and 1b) are fixed with an optical connector insertion port 2 and the end part at the opposite side thereof butted to each other.

A characteristic point in which the first preferred embodiment differs from the prior art example is that the first embodiment is provided with such a construction which shields or interrupts light transmitted toward the optical connector insertion port 2 side of the housing 1 (1a) illustrated at this side in FIG. 1a (that is, from the deep side toward to this side in FIG. 1a). The shielding construction has a shutter plate 3 and a supporting plate 4, which illustrated by diagonal lines in FIG. 1a and FIG. 1b. The shutter plate 3 can function to shield light transmitted toward the optical connector insertion port 2 side of the housing 1a. The supporting plate 4 can function to support and fix the shutter plate 3 in the housing 1a.

Figure 2A:
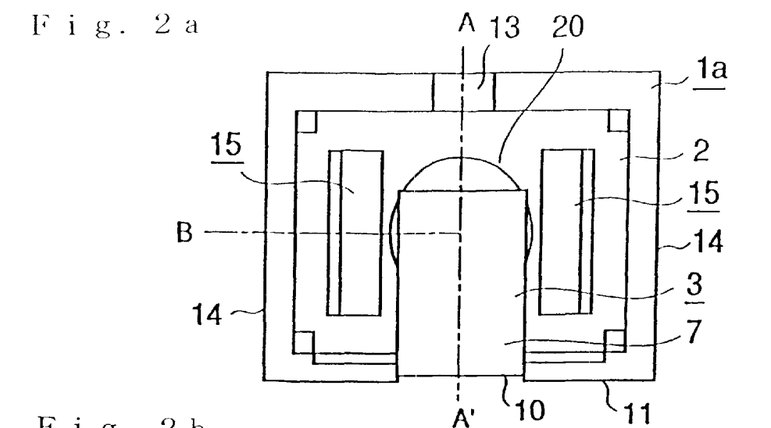
FIG. 2a is a front elevational view showing an adapter having a light shielding shutter according to the first embodiment with its shutter plate and supporting plate attached thereto.
Figure 2B:
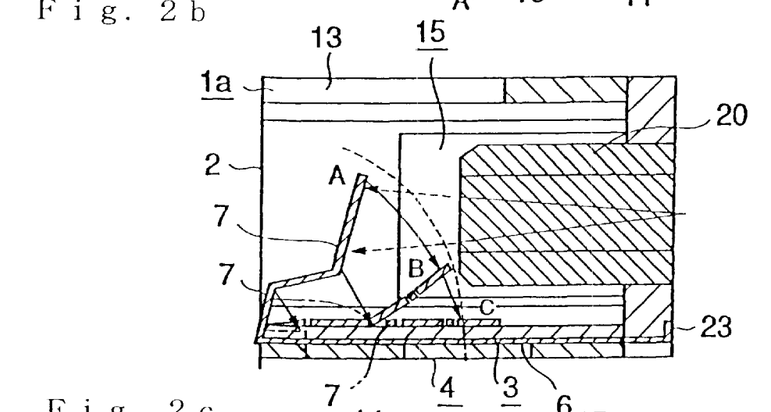
FIG. 2c is a cross-sectional view taken along the line A–A' of the housing illustrated in FIG. 2b.
Figure 2C:
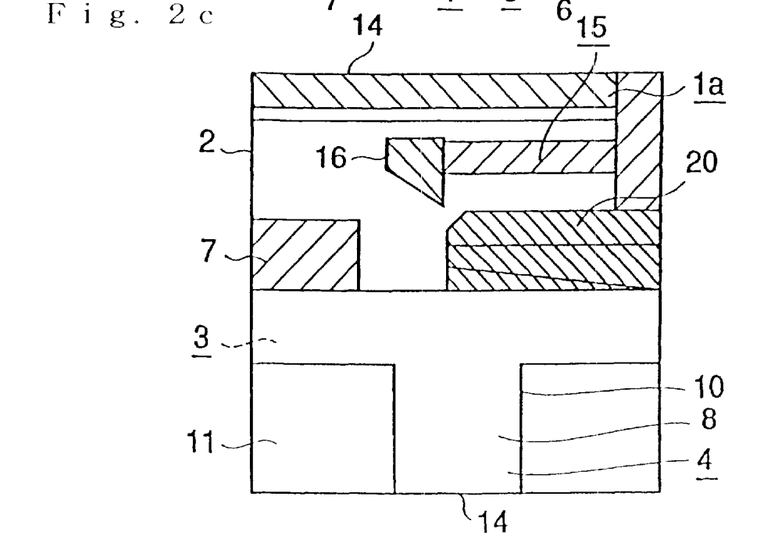
Figure 3A:
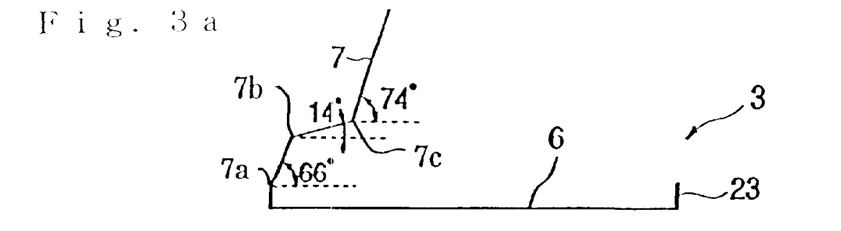
FIG. 3a is a side elevational view of a shutter plate which constitutes an adapter having a light shielding shutter according to the first embodiment.
Figure 3B:
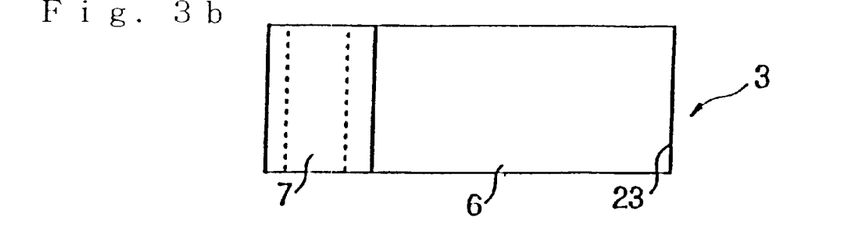
Figure 4A:
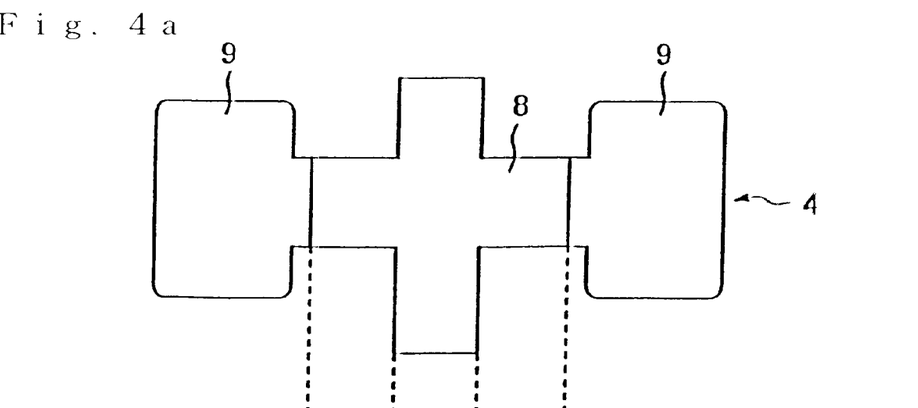
FIG. 4a is a developed view of the supporting plate that constitutes an adapter having a light shielding shutter according to the first embodiment.
Figure 4B:
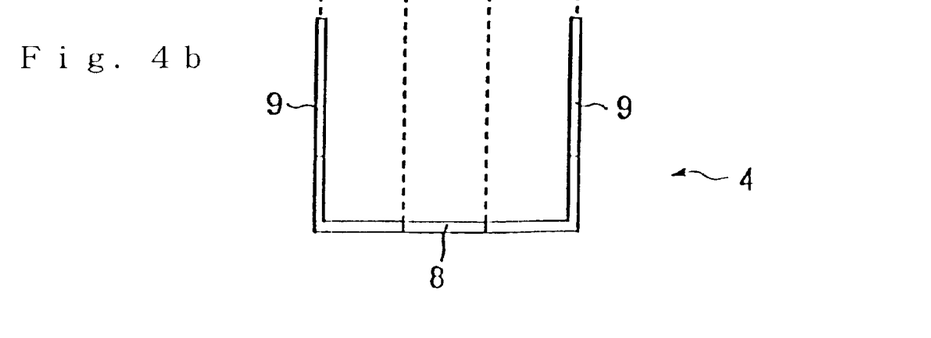

FIG. 3a shows a typical construction example of the shutter plate 3, and FIG. 3b and FIG. 3c show plan views of the shutter plate illustrated in FIG. 3a. In FIG. 4a, a typical construction example of the supporting plate 4 is shown by using a developed view. In FIG. 4b, a front elevational view of the supporting plate 4 illustrated in FIG. 4a is shown. FIG. 2a is a front elevational view of the housing 1a with the shutter plate 3 and supporting plate 4 attached in position, FIG. 2b is a sectional view of the portion A–A' of the housing 1a illustrated in FIG. 2a. FIG. 2c is a view observed from the bottom side in a state where the housing 1a shown in FIG. 2a is cut off along the line A'–B. Also, reference number 14 shown in the drawings indicates the side wall of the housing 1a.

As shown in FIG. 1, FIG. 1b, FIG. 3a and FIG. 3b, the abovementioned shutter plate 3 has a bottom plate 6 secured along the bottom outer wall 11 of the housing 1a and an erectable portion 7 diagonally erect from the bottom plate 6 toward the abovementioned optical connector insertion port 2 side, the shape of which is roughly L-shaped. The erectable portion 7 shields or interrupts light transmitted toward the optical connector insertion port 2 side. As shown in FIG. 3a, the erectable portion 7 is provided with folding segments 7a, 7b and 7c. Also, in the first preferred embodiment, the shutter plate 3 is provided with a come-off stopper 23 at the portion opposed to the erectable portion 7. The come-off stopper 23 is vertically erect from the abovementioned bottom plate 6 so that it can withstand a tensile strength in the tubular direction of the housing 1a.

The shutter plate 3 is made of a resilient material. For example, resin such as PPS (polyphenyl sulfide) and silicone rubber, etc., and metal such as bronze phosphate and NiTi alloy may be applied as the resilient material. Further, it is preferable that a material having an adequate resiliency coefficient at which an optical connector can be easily inserted and removed is selected as the resilient material of which the shutter plate 3 is made.

As shown in FIG. 1a, FIG. 1b, FIG. 4a and FIG. 4b, the supporting plate 4 is provided with a cross-shaped bottom plate 8 secured along the bottom outer wall 11 of the housing 1a and an erecting side plate 9 from the bottom plate 8 toward both side walls of the housings 1, and the shape of which is channel-shaped. The supporting plate 4 may be formed of an adequate metal such as, for example, stainless steel.

Also, in the first preferred embodiment, as shown in FIG. 2c, a bottom groove 10 formed on the bottom outer wall 11 of the housing 1a is cross-shaped. In addition, a supporting plate fitting groove 5 is formed, as shown in FIG. 1a, on both side outer walls of the housing 1a. The supporting plate fitting groove 5 communicates with the bottom groove 10 and can also accommodate a side plate 9 of the supporting plate 4. Also, a bottom groove and a side groove 26, which are similar to the abovementioned bottom groove 10 and side groove 5, are formed at the housing 1b. The bottom groove and side groove 26 formed at the housing 1b are constituted to be grooves for fitting of a fixing metal fitting to fix the adapter at the fixing portion. Further, at the central portions of the upper walls of the respective housings 1a and 1b, guiding grooves 13 are formed, which guide an optical connector inserted through the optical connector insertion port 2.

In the first embodiment, first, the bottom plate 6 of the shutter plate 3 is inserted into the bottom groove 10 of the bottom outer wall 11 of the housing 1a, and at the same time the come-off stopper 23 is inserted into a groove (not illustrated) formed at the contacted portion between the bottom portion of the housing 1a and that of the housing 1b. And, the bottom plate 8 of the supporting plate 4 is inserted into the outside of the bottom plate 6, whereby the bottom pate 6 of the shutter plate 3 is placed between the bottom outer wall 11 of the housing 1a and a bottom plate 8 of the supporting plate 4, and is fitted to and fixed in the supporting plate fitting groove 5 formed on both side outer walls of the housing 1a. And, the shutter plate 3 is fixed in the housing 1a.

Also, when attaching the shutter plate 3, the cross-shaped portion of the bottom plate 8 of the supporting plate 4 is positioned in the cross-shaped portion of the bottom plate 10. Also, the supporting plate 4 is detachably attached to the supporting plate fitting groove 5. Therefore, the shutter plate 3 is detachably fixed in the housing 1a.

In the first embodiment, as an optical connector is inserted and fitted through the optical connector insertion port 2 of the housing 1a, the erectable portion 7 of the shutter plate 3 is gradually folded toward the bottom inner wall 12 side of the housing 1a by insertion of the optical connector as shown in FIG. 2b. That is, the erectable portion is folded from position A to position B as shown in FIG. 2b, and is further folded to position C, whereby it becomes possible to allow light transmitted from the housing 1b side to enter.

Also, when the optical connector is not fitted to and inserted into the housing 1a, the erectable portion 7 of the shutter plate 3 is erected from the optical connector insertion port 2 side by its resilient restorative force (that is, the erectable portion 7 returns from position C to position A as shown in FIG. 2b). Thereby, when the connector is not applied, the erectable portion 7 of the shutter plate 3 shields or interrupts light transmitted from the housing 1b side, and the light can be prevented from leaking from the optical connector insertion port 2 to the outside of the housing 1a.

In addition, as described above, since the come-off stopper 23 of the shutter plate 3 is inserted in a groove for insertion of the come-off stopper 23, the shutter plate 3 can be prevented from coming off from the housing 1a of the adapter when removing the optical connector from the adapter.

The first preferred embodiment is constructed as described above. When an optical connector is not fitted in the housing 1a, the erectable portion 7 of the shutter plate 3 is erected to the optical connector insertion port 2 side of the housing 1a by its resilient restorative force. The erectable portion 7 shields or interrupts light transmitted from the housing 1b side to the optical connector insertion port 2 side of the housing 1a in an erect state. Therefore, even though the receiving side optical connector is disconnected by mistake, the light can be shielded or interrupted by the shutter plate 3.

Also, in the first embodiment, the shutter plate 3 is a plate having a very simple L-shaped construction consisting of an erectable portion 7 and a bottom plate 6. Further, as shown in FIG. 1a and FIG. 4b, the supporting plate 4 that supports the shutter plate 3 and fixes it in the housing 1a is of a simple construction consisting of the bottom plate 8 and side plate 9. Therefore, it is possible to very easily manufacture the shutter plate 3 and the supporting plate 4.

In addition, in the first embodiment, only by placing the shutter plate 3 between the supporting plate 4 and the bottom outer wall 11 of the housing 1a and fitting and fixing the side plate 9 of the supporting plate 4 in the supporting plate fitting groove 5 secured on the side outer wall of the housing 1a, the shutter plate 3 can be fixed in the housing 1a, whereby it is possible to very easily produce an adapter having a light shielding shutter at a high yield ratio.

In particular, the supporting plate fitting groove 5 employs a groove for the fitting of a fixing metal fitting to fix the adapter at its fixing portion. Therefore, there is no need to newly form a groove on both side outer walls of the housing 1a, wherein the adapter can be very simply produced.

Further, in the first embodiment, the shutter plate 3 and supporting plate 4 are constructed so as to be fitted into the bottom groove 10 and supporting plate fitting groove 5. Therefore, there is no case where the shutter plate 3 and supporting plate 4 come out of the housing 1a, and the adapter can be used as in the prior art specifications.

In addition, in the first embodiment, since the shutter plate 3 is made into a roughly L-shaped plate and is supported and fixed by the supporting plate 4, the shutter plate 3 that must be made of a special material having an excellent light shielding property can be minimized. Thus, since the shutter plate 3 can be made smaller, production cost thereof can be reduced, and since it is possible to easily produce the shutter plate 3 as described above, production costs thereof can be still further decreased, whereby it is possible to provide an inexpensive adapter having a light shielding shutter.

Hereinafter, a description is given of a second preferred embodiment of an adapter having a light shielding shutter according to the invention. Also, in the description of the second embodiment, components which are identical to those of the first embodiment are given the same reference numbers, and overlapping description of the common components is omitted.

Figure 5A:
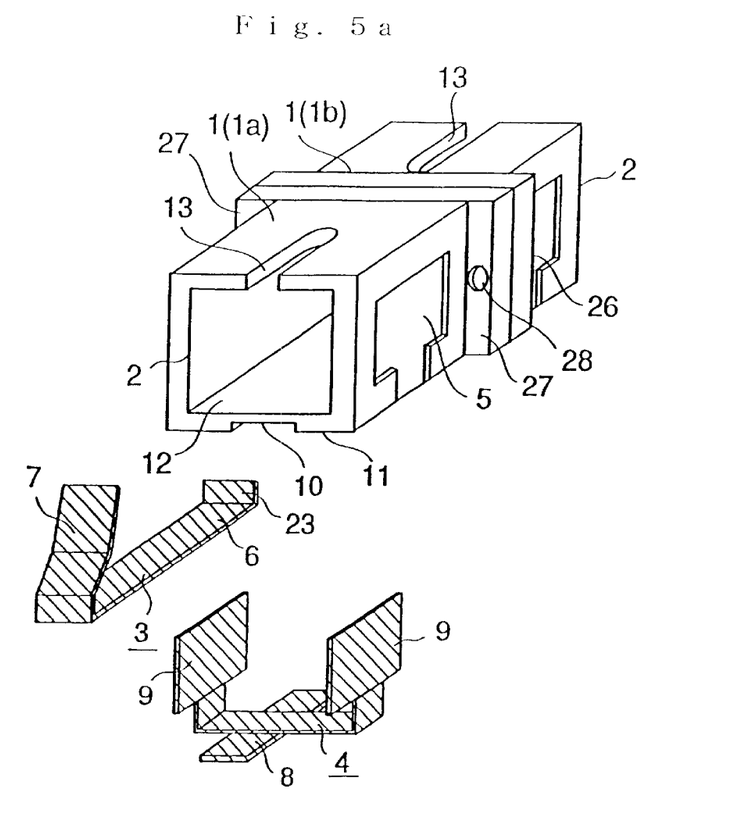
FIG. 5a is a perspective view showing a housing, shutter plate and supporting plate that constitute an adapter having a light shielding shutter according to the second embodiment.
Figure 5B:
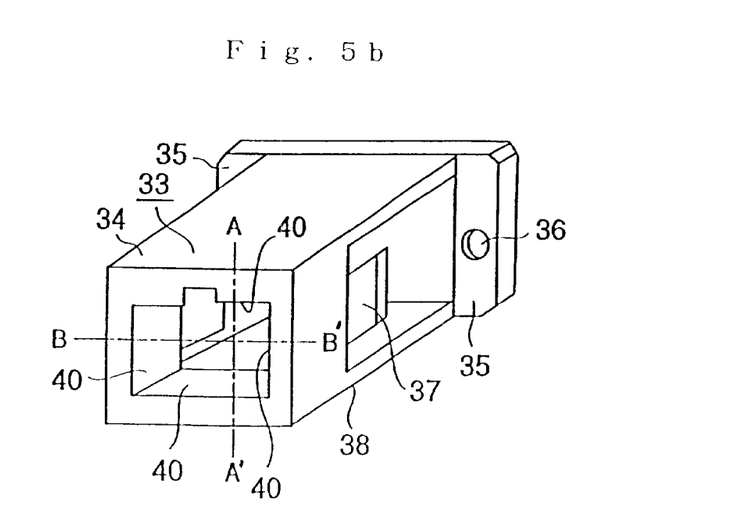

A characteristic point of the second embodiment, which differs from the first embodiment, is the provision of a flange at both sides of the side portion of the housing 1 as shown in FIG. 5, and the provision of a guiding member as shown in FIG. 5b in the housing 1. All the other constructions than the above are almost similar to that of the first embodiment.

Figure 6A:
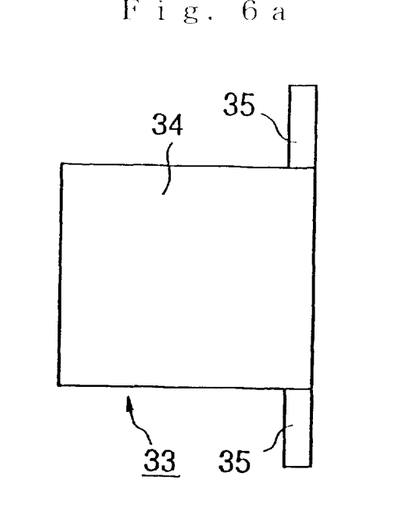
FIG. 6a is a plan view of a guiding member illustrated in FIG. 5b.
Figure 6B:
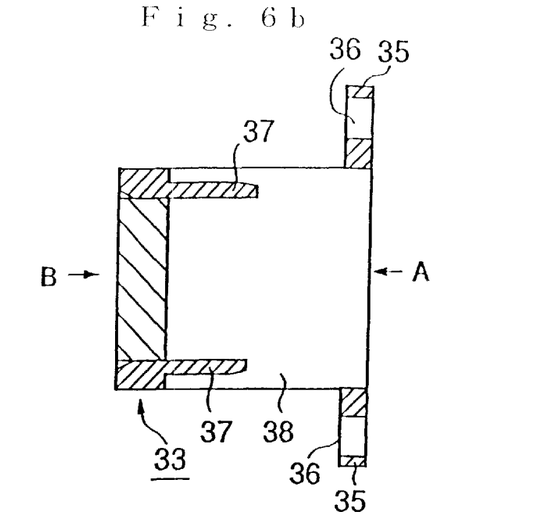
FIG. 6b is a sectional view of a portion B—B of the guiding member illustrated in FIG. 5b.
Figure 6C:
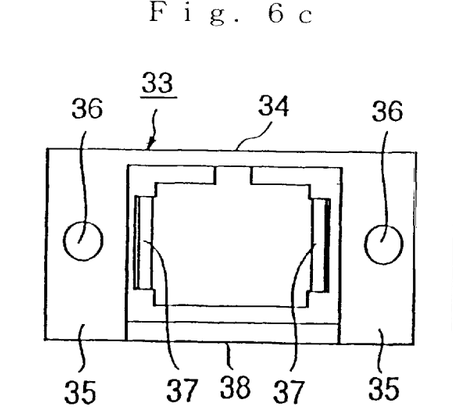
FIG. 6c is a view where the guiding member is observed from the direction A shown in FIG. 6b.
Figure 6D:
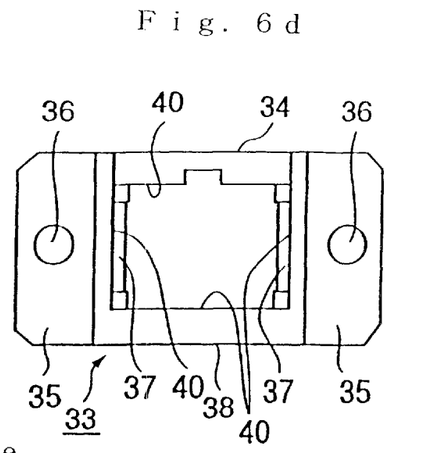
FIG. 6d is a view where the guiding member is observed from the direction B shown in FIG. 6b.
Figure 6E:
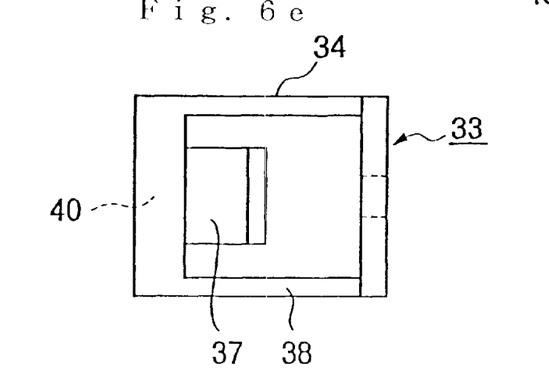
FIG. 6e is a view of the guiding member illustrated in FIG. 5b.

FIG. 6a is a plan view of the abovementioned guiding member 33. In FIG. 6b, a cross-sectional view of a portion B—B of the guiding member 33 illustrated in FIG. 6a is shown. FIG. 6c shows a state where the guiding member 33 is observed from the direction A illustrated in FIG. 6b, FIG. 6d shows a state where the guiding member 33 is observed from the direction B illustrated in FIG. 6b, and FIG. 6e is a side elevational view of the guiding member 33.

Figure 7A:
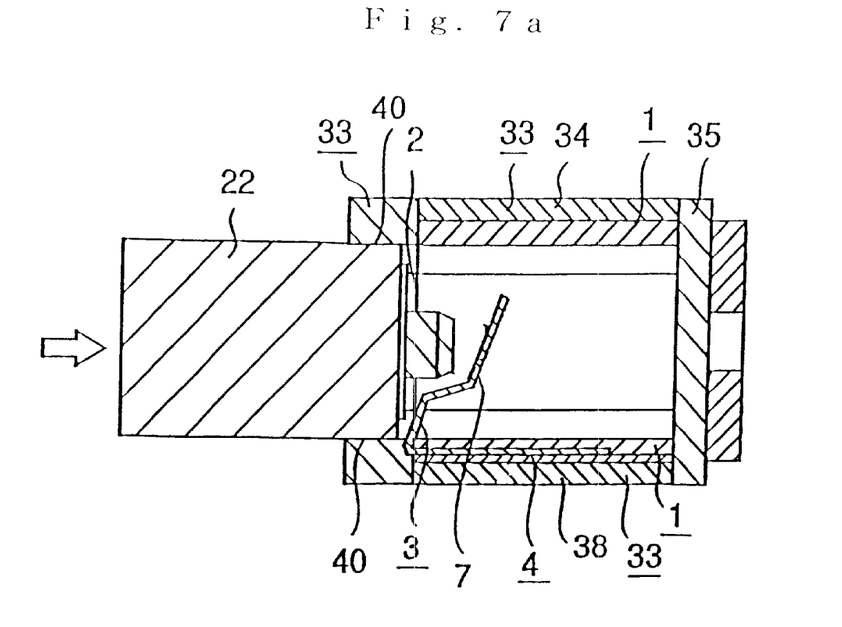
FIG. 7a is a view explaining an insertion action of optical connectors into an adapter having a light shielding shutter according to the second embodiment, using a sectional view observed from the side view thereof.
Figure 7B:
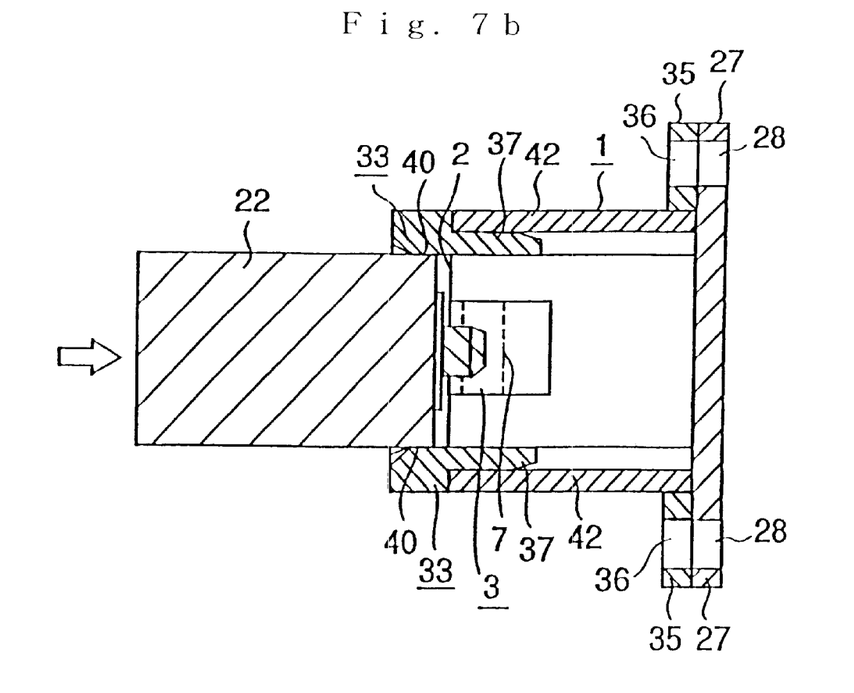
FIG. 7b is a view. explaining an insertion action of optical connectors into an adapter having a light shielding shutter according to the second embodiment, using a sectional view observed from the upper side thereof.

The guiding member 33 shown in FIG. 5b, FIG. 6a through FIG. 6e is that attached to the housing 1a as shown in FIG. 7a and FIG. 7b. The guiding member 33 has a tubular insertion guiding portion 40, which can guide the insertion direction of an optical connector, at the tip end side thereof. Also, FIG. 7a is a view showing an insertion action of an optical connector 22 into an adapter having a light shielding shutter according to the second embodiment, using a cross-sectional view of a portion A–A' shown in FIG. 5b. FIG. 7b is a view showing an insertion action of an optical connector 22 into an adapter having a light shielding shutter according to the second embodiment as well, using a cross-sectional view of a portion B–B' illustrated in FIG. 5b.

The upper plate 34 and bottom plate 38 of the abovementioned guiding member 33 are disposed with a spacing therebetween. An engaging portion 37 is secured at both side faces of the guiding member 33 in a pattern of being placed between the upper plate 34 and the bottom plate 38. When the guiding member 33 is inserted into the optical connector insertion port 2 of the housing 1a, the engaging portion 37 is constructed so as to be engaged in an engagement portion 42 of the housing 1 as shown in FIG. 7b.

A flange portion 35 corresponding to the flange portion 27 of the housing 1 is formed at both sides in the guiding member 33. A hole 28 is prepared in the flange portion 27 of the housing 1, and a hole 36 is prepared so as to correspond to the abovementioned hole 28 in the flange portion 35 of the guiding member 33. By inserting a common pin into the holes 28 and 36 with the guiding member 33 attached, the guiding member 33 is fixed in the housing 1a.

In the second embodiment, the tip end side of the guiding member 33 protrudes forward from the optical connector insertion port 2 of the housing 1a in a state where the guiding member 33 is mounted and fixed in the housing 1a as described above.

The second embodiment is constructed as described above, and the second embodiment can bring effects similar to those of the first embodiment.

Also, the second embodiment is such that the guiding member 33 is formed in and attached to the housing 1, and an insertion guiding portion 40, which can guide the insertion direction of an optical connector, is formed at the guiding member 33. Therefore, as shown in FIG. 7a and FIG. 7b, as an optical connector 22 is inserted into the housing 1a, the optical connector 22 is inserted along the tubular direction of the housing 1a in a state where the optical connector 22 is positioned by the insertion guiding portion 40.

That is, in the second embodiment, it is possible to prevent the optical connector 22 from being diagonally inserted with respect to the tubular direction of the housing 1a. Therefore, it is possible to accurately fold the erectable portion 7 of the shutter plate 3 toward the bottom inner wall 12 side of the housing 1 at the tip end side of the optical connector, whereby an optical connector can be very securely inserted into the housing 1.

Figure 10:
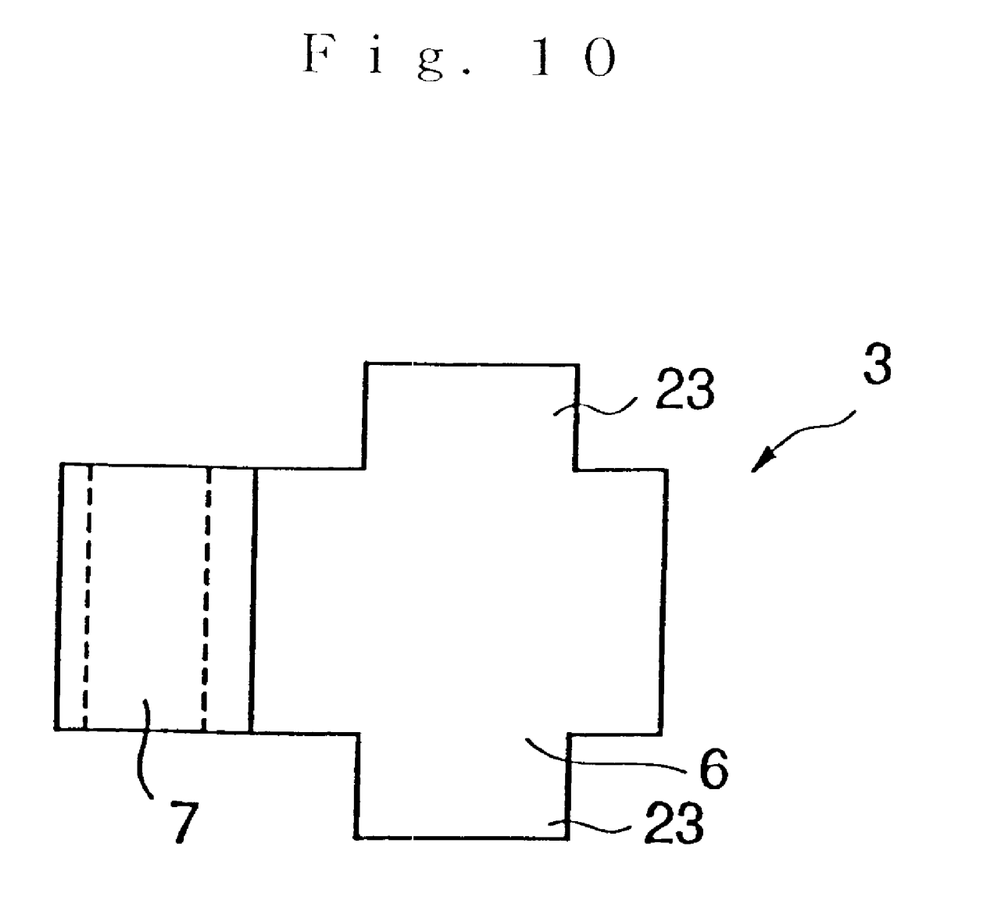
FIG. 10 is a plan view showing another mode of the shutter plate.

Also, the invention is not limited to the abovementioned respective embodiments, and may be subjected to various modifications. For example, in the respective embodiments, although the shutter plate 3 is shaped as shown in FIG. 1 and FIG. 3a, the shutter plate 3 may be shaped so as to have, for example, a come-off stopper 23 as shown by chain lines in FIG. 1a. Also, FIG. 10 is an upper plan view of a shutter plate 3 provided with a come-off stopper 23 shown by the chain lines.

That is, the shutter plate 3 applied to the respective embodiments is provided with a come-off stopper 23, which is vertically erect from the bottom plate 6, at the position opposed to the erectable portion 7. On the contrary, in the shutter plate 3 illustrated in FIG. 10 above, the bottom plate 6 is cross-shaped, wherein the portions protruding to both sides of the bottom plate 6 of the shutter plate 3 are used as a come-off stopper 23. The come-off stopper 23 is formed so as to be engaged in the bottom groove 10 secured on the bottom outer wall of the housing 1.

As described above, since the bottom plate 6 of the shutter plate 3 is cross-shaped, the contacting area between the housing 1 and the supporting plate 4 can be widened, whereby, for example, when an optical connector fitted to an adapter is removed therefrom, it is possible to securely prevent the shutter plate 3 from coming off from the housing 1.

Also, in the respective embodiments, such a construction is employed, in which a supporting plate 4 is fixed in the housing 1a, and a fixing metal fitting to fix the adapter at its fixing portion is fixed at the housing 1b. However, the supporting plate 4 may be constructed so as to be concurrently used as the abovementioned metal fitting to fix the adapter.

Further, in the respective embodiments, the adapter is constructed so that the housings 1a and 1b are fixed and an optical connector to be inserted through the optical connector insertion port 2 of the housings 1a and 1b is fitted. However, the present invention not only applies to such an adapter having two fixed housings 1a and 1b, but it may be applicable to, for example, an adapter in which at least one housing 1 is provided, and an optical connector is inserted and fitted through an optical connector insertion port 2 of the housing 1.

Still further, the respective embodiments refer to an adapter in which an SC connector is inserted and fixed as an optical connector. However, the present invention may be applicable to an adapter that is used to insert and fit other optical connectors such as an MPO optical connector, etc. Also, in the respective embodiments, although the housing 1 is square-tubular, the housing 1 may be shaped so as to correspond to the shape of an optical connector to be inserted and fitted, for example, cylindrical.

Figure 8A:
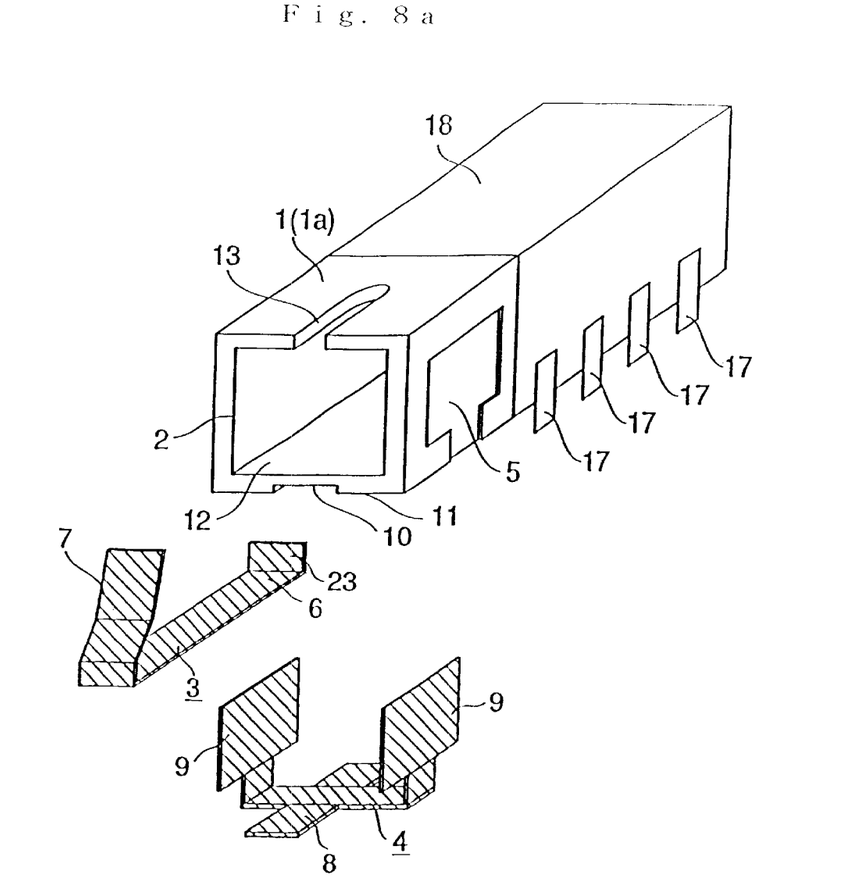
FIG. 8a is a disassembled view showing one example of an optical module receptacle having a light shielding shutter according to the invention.
Figure 8B:
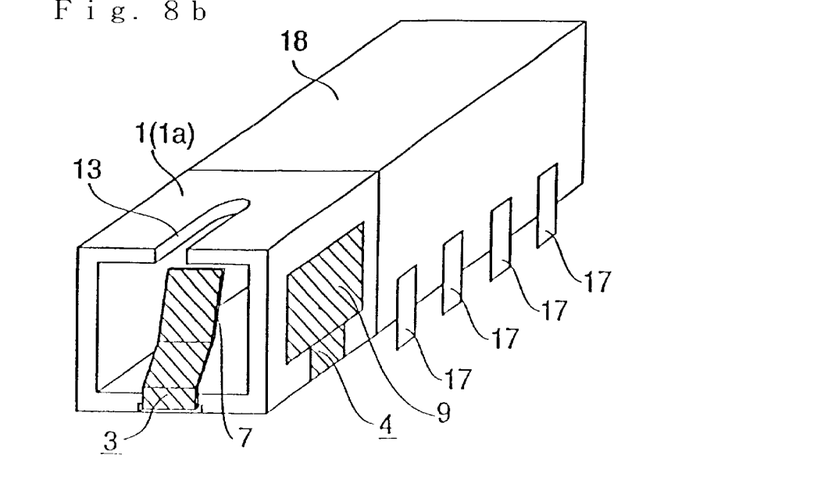
FIG. 8b is a perspective view of an optical module receptacle having a light shielding shutter illustrated in FIG. 8a, FIG. 9a is a disassembled view showing another example of an optical module receptacle having a light shielding shutter according to the invention.

Still further, as shown in, for example, FIG. 8a and FIG. 8b, the invention may be applicable to an optical module receptacle an LD (laser diode) module-incorporated package 18 is provided at the side opposed to the optical connector insertion port of the housing 1. In this case, for example, as in the respective embodiments, an optical module receptacle having a light shielding shutter may be prepared by providing the housing 1 with a shutter plate 3 and a supporting plate 4.

Also, FIG. 8a and FIG. 8b show an example in which the first embodiment of the adapter is applied to an optical module receptacle. Still further, as in the second embodiment of the adapter, a construction in which a guiding member 33 is mounted in the housing 1 may be applied to an optical module receptacle.

Figure 9A:
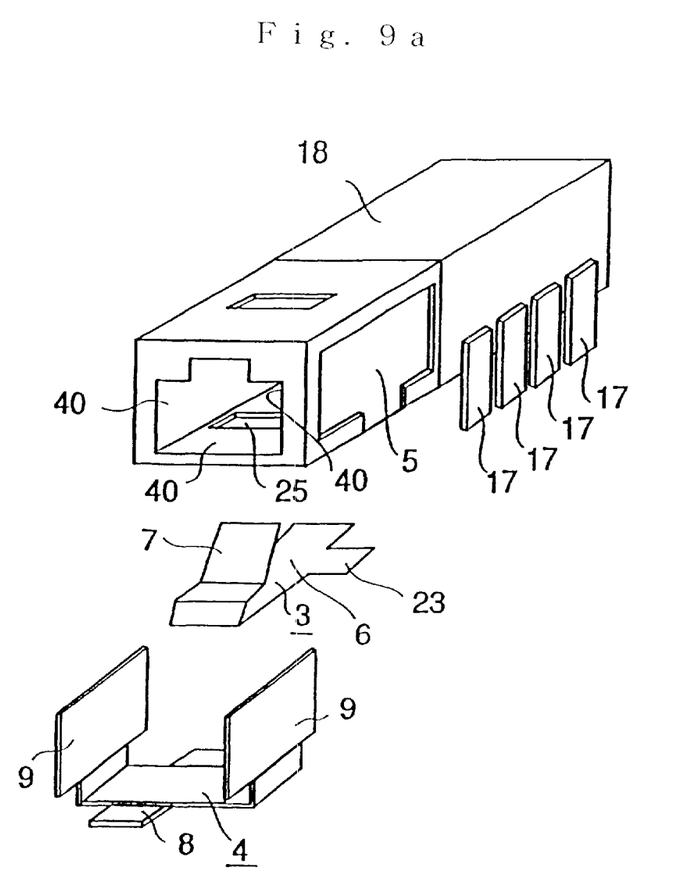
Figure 9B:
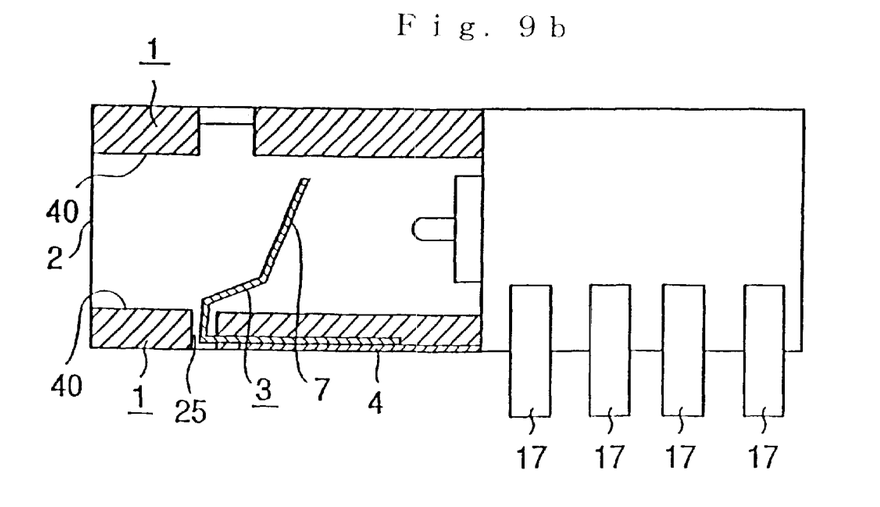
FIG. 9b is a view showing the major parts of an optical module receptacle having a light shielding shutter illustrated in FIG. 9a, using the section thereof.

In addition, as shown in FIG. 9a and FIG. 9b, in the optical module receptacle, a shutter plate insertion hole 25 may be formed midway in the tubular direction of the corresponding housing 1 on the bottom of the housing 1. In this case, the erectable portion 7 of the shutter plate 3 is constructed so as to be erect from the shutter plate insertion portion 25 into the tubular hole of the housing 1. In this case, a tubular hole of the housing 1 from the optical connector insertion port 2 to the portion where the shutter plate insertion hole 25 is formed is constructed as an insertion guiding portion 40 which guides insertion of an optical connector.

With the construction shown in FIG. 9a and FIG. 9b, an optical connector may be inserted into the housing 1 in a state where the optical connector is positioned by the insertion guiding portion 40, whereby there is no case where the optical connector becomes diagonal with respect to the tubular direction of the housing 1, and the optical connector can be very accurately inserted. That is, the shutter plate insertion hole 25 can bring about effects similar to those of the construction in which a guiding member 33 described with respect to the second embodiment is attached to the housing 1.

Also, although a shutter plate 3 shown in FIG. 10 is applied to an optical module receptacle illustrated in FIG. 9a and FIG. 9b, for example, a shutter plate 3 shown in FIG. 3a may be used instead.

Also, the housing 1 shown in FIG. 9a and FIG. 9b may be applied to an adapter shown in FIG. 1a. In this case, effects similar to the above may be brought about.

What is claimed is:

1. An adapter comprising:
    a tubular housing, in which one end portion of said housing is constructed as an insertion port of an optical connector, through which an optical connector is inserted in the longitudinal direction of the tubular housing;
    a roughly L-shaped light shielding shutter, wherein the shutter is made of a resilient material and having a bottom plate secured along a bottom outer wall of the housing and an erectable portion which is erect from said bottom plate toward an optical connector insertion port side, and wherein the shutter interrupts light transmitted from an other end portion of said housing side toward the optical connector insertion port side; and
    a supporting plate having a bottom plate secured along the bottom outer wall of the housing and a side plate erect from said bottom plate along both side walls of the housing;
    wherein the bottom plate of said shutter is placed between the bottom outer wall of said housing and the bottom plate of said supporting plate, said shutter is fixed at said housing by causing the side plate of the supporting plate to be fixed, the erectable portion of said shutter is folded in a bottom inner wall of said housing by said erectable portion of said shutter being inserted into an optical connector when said optical connector is inserted into the adapter to enable said light to enter the optical connector, and when said optical connector is not fitted in the adapter, said light is interrupted by the erectable portion of said shutter being made erect toward said optical connector insertion port side.

2. An adapter having a light shielding shutter as set forth in claim 1, wherein a supporting plate fitting groove to which a side plate of the supporting plate is fitted is formed at the outer wall at both sides of the housing, and the side plates of said supporting plate are fitted to and fixed at said supporting plate fitting groove so that the outer plates at both side of the housing are placed between the side plates of said supporting plate.

3. An adapter having a light shielding shutter as set forth in claim 1, wherein a guiding member provided with an insertion guiding portion, which guides the insertion direction of optical connectors, is mounted on the housing so as to cause a tip end side thereof to protrude forward from the optical connector insertion port of the housing.

4. An adapter having a light shielding shutter as set forth in claim 2, wherein a guiding member provided with an insertion guiding portion, which guides the insertion direction of optical connectors, is mounted on the housing so as to cause a tip end side thereof to protrude forward from the optical connector insertion port of the housing.

5. An adapter having a light shielding shutter as set forth in claim 1, wherein a shutter plate insertion hole is formed on the bottom of said housing, and the erectable portion of the shutter plate is constructed so as to be erect from said shutter plate insertion hole into a tube of the housing, wherein a tubular hole of the housing from the optical connector insertion portion to the portion where said shutter plate insertion hole is formed is constructed as an insertion guiding portion which guides the insertion direction of optical connectors.

6. An adapter having a light shielding shutter as set forth in claim 2, wherein a shutter plate insertion hole is formed on the bottom of said housing, and the erectable portion of the shutter plate is constructed so as to be erect from said shutter plate insertion hole into a tube of the housing, wherein a tubular hole of the housing from the optical connector insertion portion to the portion where said shutter plate insertion hole is formed is constructed as an insertion guiding portion which guides the insertion direction of optical connectors.

7. An adapter having a light shielding shutter as set forth in claim 1, wherein a cross-shaped portion is formed on the bottom plate of the supporting plate.

8. An adapter having a light shielding shutter as set forth in claim 2, wherein a cross-shaped portion is formed on the bottom plate of the supporting plate.

9. An adapter having a light shielding shutter as set forth in claim 5, wherein a cross-shaped portion is formed on the bottom plate of the supporting plate.

10. An adapter having a light shielding shutter as set forth in claim 6, wherein a cross-shaped portion is formed on the bottom plate of the supporting plate.

11. An optical module receptacle comprising:
    a tubular housing, one end portion of which is constructed as an optical connector insertion portion through which an optical connector is inserted;
    a roughly L-shaped light shielding shutter plate made of a resilient material and having a bottom plate which is secured along a bottom outer wall of said housing and an erectable portion which is erect from said bottom plate toward an optical connector insertion port side, and wherein the shutter shields light transmitted from an other end side of said housing toward the optical connector insertion port side; and
    a supporting plate having a bottom plate secured along the bottom outer wall of said housing and a side plate erect along both side walls of the housing from said bottom plate;
    wherein the bottom plate of said shutter plate is placed between the bottom outer wall of said housing and the bottom plate of said supporting plate, said shutter plate is fixed at said housing by causing the side plate of the supporting plate to be fixed, the erectable portion of said shutter plate is folded toward a bottom inner wall side of said housing by insertion of an optical connector when said optical connector is inserted into and fitted to the optical module receptacle to allow said light to enter the optical connector, and said erectable portion of said shutter plate is erected toward said optical connector insertion port side by its resilient restorative force to interrupt or shield the light.

12. An optical module receptacle having a light shielding shutter as set forth in claim 11, wherein a supporting plate fitting groove to which a side plate of the supporting plate is fitted is formed at the outer wall at both sides of the housing, and the side plates of said supporting plate are fitted to and fixed at said supporting plate fitting groove so that the outer plates at both side of the housing are placed between the side plates of said supporting plate.

13. An optical module receptacle having a light shielding shutter as set forth in claim 11, wherein a guiding member provided with an insertion guiding portion, which guides the insertion direction of optical connectors, is mounted on the housing so as to cause a tip end side thereof to protrude forward from the optical connector insertion port of the housing.

14. An optical module receptacle having a light shielding shutter as set forth in claim 12, wherein a guiding member provided with an insertion guiding portion, which guides the insertion direction of optical connectors, is mounted on the housing so as to cause a tip end side thereof to protrude forward from the optical connector insertion port of the housing.

15. An optical module receptacle having a light shielding shutter as set forth in claim 11, wherein a shutter plate insertion hole is formed on the bottom of said housing, and the erectable portion of the shutter plate is constructed so as to be erect from said shutter plate insertion hole into a tube of the housing, wherein a tubular hole of the housing from the optical connector insertion portion to the portion where said shutter plate insertion hole is formed is constructed as an insertion guiding portion which guides the insertion direction of optical connectors.

16. An optical module receptacle having a light shielding shutter as set forth in claim 12, wherein a shutter plate insertion hole is formed on the bottom of said housing, and the erectable portion of the shutter plate is constructed so as to be erect from said shutter plate insertion hole into a tube of the housing, wherein a tubular hole of the housing from the optical connector insertion portion to the portion where said shutter plate insertion hole is formed is constructed as an insertion guiding portion which guides the insertion direction of optical connectors.

17. An optical module receptacle having a light shielding shutter as set forth in claim 11, wherein a cross-shaped portion is formed on the bottom plate of the supporting plate.

18. An optical module receptacle having a light shielding shutter as set forth in claim 12, wherein a cross-shaped portion is formed on the bottom plate of the supporting plate.

19. An optical module receptacle having a light shielding shutter as set forth in claim 15, wherein a cross-shaped portion is formed on the bottom plate of the supporting plate.

20. An optical module receptacle having a light shielding shutter as set forth in claim 16, wherein a cross-shaped portion is formed on the bottom plate of the supporting plate.

\* \* \* \* \*